United States Patent [19]

Ellwood et al.

[11] Patent Number: 5,117,252
[45] Date of Patent: May 26, 1992

[54] ELECTRONIC FLASH CONTROL SYSTEM FOR USE IN A FIXED FOCUS LENS CAMERA FOR INCREASING DEPTH OF FIELD BY THE TIMING OF FLASH ACTUATION

[75] Inventors: Jennifer K. Ellwood, Somerville; John P. Gaewsky, Reading, both of Mass.; James C. Magno, Jr., Center Barnstead, N.H.

[73] Assignee: Polaroid Corporation, Cambridge, Mass.

[21] Appl. No.: 576,978

[22] Filed: Sep. 4, 1990

[51] Int. Cl.$^5$ .......................... G03B 7/00; G03B 15/03
[52] U.S. Cl. .................................. 354/415; 354/416; 354/137
[58] Field of Search ............... 354/415, 416, 417, 433, 354/137

[56] References Cited

U.S. PATENT DOCUMENTS

| | | | |
|---|---|---|---|
| 4,188,103 | 2/1980 | Biber et al. | 354/137 |
| 4,256,995 | 3/1981 | Ishida | 354/415 |
| 4,459,005 | 7/1984 | Harvey | 354/403 |
| 4,669,850 | 6/1987 | Uchiyama et al. | 354/416 |
| 4,878,081 | 10/1989 | Kishida et al. | 354/137 |
| 4,894,678 | 1/1990 | Farrington et al. | 354/415 |

Primary Examiner—W. B. Perkey
Assistant Examiner—Cassandra C. Spyrou
Attorney, Agent, or Firm—John J. Kelleher

[57] ABSTRACT

The depth of field of a fixed focus lens in an electronic flash camera is automatically increased and the sharpness or clarity of an image formed by the lens is improved for subjects located closer to the camera than the near end of the lens' normal depth of field by firing the camera's electronic flash at an aperture size that is smaller than one that would normally be used for such closer subjects.

1 Claim, 4 Drawing Sheets

ELECTRONIC FLASH CONTROL SYSTEM FOR USE IN A FIXED FOCUS LENS CAMERA FOR INCREASING DEPTH OF FIELD BY THE TIMING OF FLASH ACTUATION

BACKGROUND OF THE INVENTION

1. Field of the Invention

The present invention relates to an electronic flash camera having a fixed focus lens and a scanning aperture, in general, and to such a camera wherein an exposure control system thereof increases the lens's depth of field for relatively close subjects to improve the sharpness of an image of such subjects formed by the lens, in particular.

2. Description of the Prior Art

It is well known that the sharpness of an image formed by a lens at an image plane is primarily dependent upon the exactness of focus of the image at the image plane. When a lens is focused to produce a sharp image of a particular object at the image plane, other objects that are closer or further away do not appear equally sharp. The decline in sharpness is gradual and there is a spacial zone extending in front of and behind the focused subject where the image misfocus is too small to be easily noticeable and therefore can be accepted as sharp. This zone is commonly referred to as the depth of field of the lens.

In the beginning, photographic cameras only employed lenses of the fixed focus type. In order to form photographic images of acceptable sharpness with such lenses over the greatest possible range of subject distances, their optical characteristics had to be chosen such that the near distance of their depth of field could only extend to within approximately 4 to 5 feet of the camera for an f/14 lens, if images of distant objects (objects at infinity) were to have an acceptably sharp focus at the camera's film plane. An image of an object produced by this type of lens that is located closer to the camera than this near distance would appear blurred or noticeably out of focus.

The production of sharp images of distant as well as relatively close object is not a problem with an adjustable focus lens. With such a lens, the focus distance and its associated depth of field can be adjusted to produce acceptably sharp images of objects located at virtually any object distance. While an adjustable focus lens has many advantages, including the just-mentioned ability to vary its depth of field, such a lens has certain disadvantages. Among the disadvantages are cost and the increased susceptibility to mechanical failure of its focusing mechanism over that of a fixed focus lens.

An electronic flash, fixed focus lens camera that is capable of forming sharp images of objects located closer to the lens than the near distance of its normal depth of field, has been disclosed. In U.S. Pat. No. 4,459,005 to Harvey, for example, exposure control apparatus for an electronic flash, fixed focus lens camera includes means for controlling exposure with either of two predetermined apertures. The apparatus includes proximity sensing means for detecting when a subject to be photographed is within a given near distance of the camera and a mechanism for restricting the exposure aperture to a size that is less than the aperture size the exposure control mechanism would normally employ when the subject is within the aforementioned given near distance. The proximity sensing means includes a light emitting diode for illuminating a subject to be photographic with infrared (IR) light and a sensor for measuring subject IR reflectivity. Among the disadvantages inherent in this type of electronic flash, exposure control apparatus are the relatively complex mechanism required to establish the selectable above-noted predetermined apertures, the relatively large amount of time required to actuate the aperture size controlling mechanism to its aperture size determining position prior to initiating an exposure interval and the inability to easily change the size of the above-noted predetermined aperture once they have been incorporated into the exposure control system design of a camera.

In U.S. Pat. No. 4,894,678 to Farrington et al., an exposure control system is disclosed that is also capable of forming sharp images of objects located closer to the lens than the near distance of its normal depth of field. An image of a subject in a scene formed by a fixed focus lens through a scanning aperture of an electronic flash camera, particularly that of a subject located closer to the lens than the near distance of the lens's normal depth of field, has its clarity or sharpness substantially improved by firing the electronic flash during exposure at the smallest possible aperture for optimum subject-image sharpness and overall scene exposure. The appropriate aperture employed to produce such an image is a function of ambient scene brightness and of the infrared light from the electronic flash reflected from a subject within the scene which are sensed prior to an exposure interval. While this type of exposure control system is very effective in producing photographs having optimum subject-image sharpness and overall scene exposure, it is a relatively costly method for controlling the exposure of a photographic image in a camera.

SUMMARY OF THE INVENTION

In accordance with a preferred embodiment of the present invention an image of a subject in a scene formed by a fixed focus lens through a scanning aperture of an electronic flash camera, that is located closer to the camera than the near distance of the lens's normal depth of field, has its clarity of sharpness substantially improved by a simple, low cost exposure control system that maximizes the lens depth of field for these close subjects. The subject is illuminated with a pulse of light from the electronic flash during an exposure cycle, immediately prior to an exposure interval. If the amount of reflected light exceeds a predetermined threshold indicating that the subject is closer than the near end of the lens's normal depth of field, the exposure control system fires the electronic flash at a time when the aperture size is small enough to maximize the lens's depth of field and thereby improve subject image sharpness. If the amount of reflected light does not exceed the predetermined threshold the camera functions in its normal exposure control mode.

It is a primary object of the present invention therefore, to provide a simplified, low cost exposure control system that will improve the sharpness or clarity of an image formed by a fixed focus lens of subjects located closer to the lens than the near distance of the lens's normal depth of field.

It is another object of the present invention to provide an exposure control system for a camera that will improve the sharpness or clarity of an image formed by a fixed focus lens of subjects located closer to the camera than the lens's normal depth of field, wherein the size of depth of field of the lens for such close objects can be readily changed from one size to another, during the camera manufacturing process should it become necessary.

It is a further object of the present invention to provide an exposure control system for a camera that will improve the sharpness or clarity of an image formed by a fixed focus lens of subjects located closer to the camera than the lens's normal depth of field that will reduce the amount of time required to place the exposure control system in condition to so improve an image of a subject formed in such a manner.

Other object, features and/or advantages of the present invention will be readily apparent from the following detailed description of a preferred embodiment thereof when taken in conjunction with the accompanying drawings.

DETAILED DESCRIPTION OF THE PREFERRED EMBODIMENT

Figure 1:
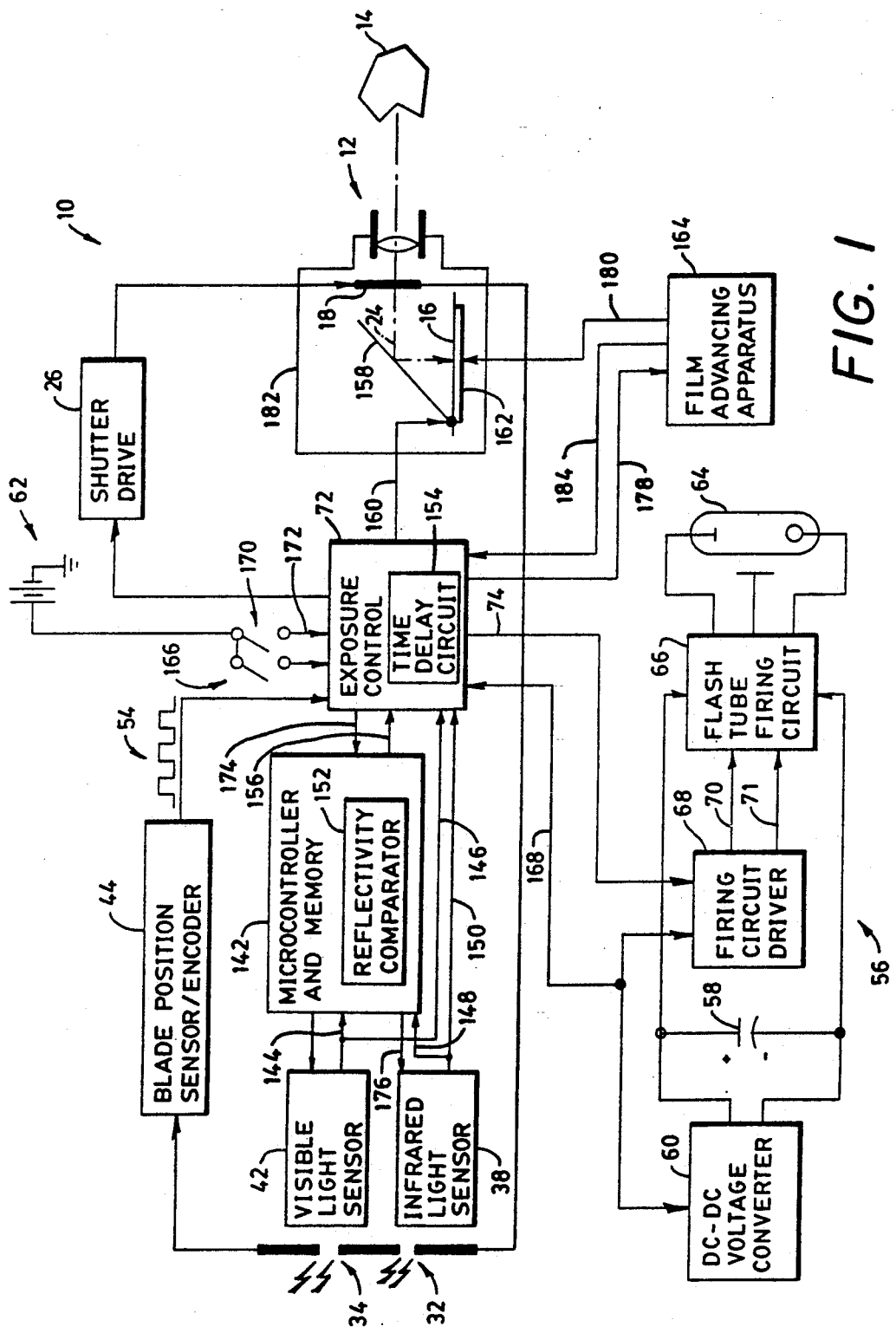
FIG. 1 is a schematic diagram of an electronic flash camera which incorporates a preferred embodiment of the simplified, low cost exposure control system of the present invention.

Referring now to the drawings, and specifically to FIG. 1, there is shown a single lens reflex (SLR) electronic flash camera 10, of the self-developing type, which incorporates a preferred embodiment of the simplified, low cost exposure control system of the present invention. The camera 10 includes an objective or taking lens 12 of the adjustable focus type that may include one or more elements (only one shown) for focusing image-carrying light rays of, for example, an object 14 on a film plane 16.

Figure 2A:
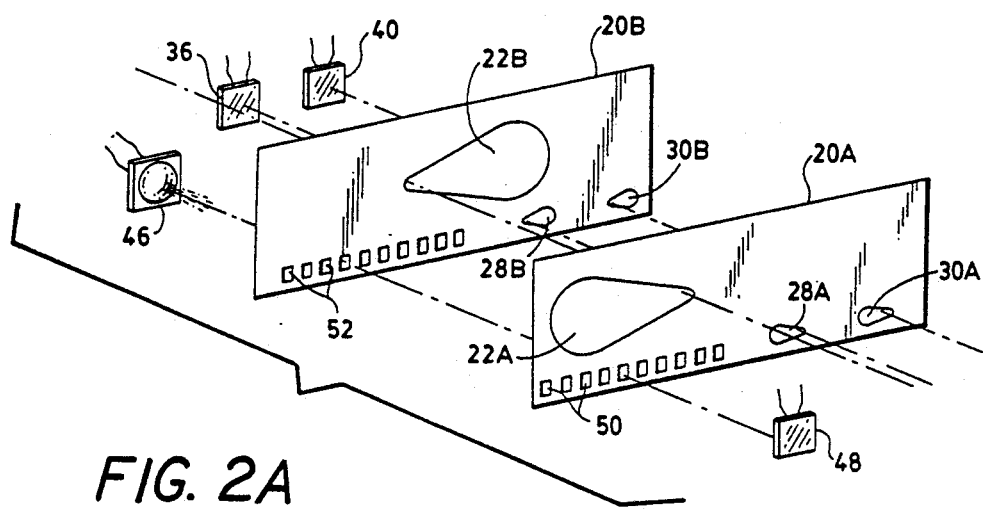
FIG. 2A is an exploded perspective view of a scanning type shutter blade mechanism which is also schematically shown in FIG. 1.
Figure 2B:
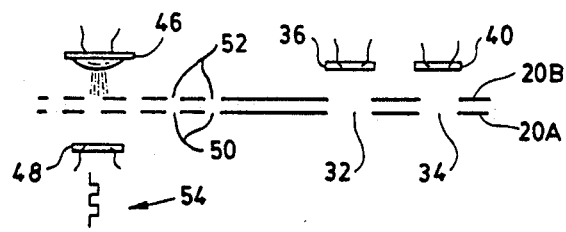
FIG. 2B is a unexploded top view, partly in section, of the scanning-type shutter blade mechanism of FIG. 2A.

With additional reference to FIGS. 2A and 2B, a blade mechanism 18 positioned intermediate the lens 12 and a film plane 16, includes a pair of overlapping shutter blade elements 20A and 20B of the "scanning" type. Scene light admitting primary apertures 22A and 22B, are respectively provided in the blade elements 20A and 20B to cooperatively define a progressive and predictable variation of effective aperture openings in accordance with simultaneous displacement of one blade element with respect to the other blade element in a manner more fully described in commonly assigned U.S. Pat. No. 3,942,183 to Whiteside, now specifically incorporated herein by reference. The blade element apertures are selectively shaped and positioned so as to overlie a central optical axis 24 of the lens 12 thereby defining a gradually varying effective aperture size as a function of the position of the blades of the blade mechanism 18. A shutter drive 26 is provided for displacing the blade elements 20A and 20B of the blade mechanism 18. The shutter drive 26 includes a tractive electromagnetic device in the form of a solenoid (not shown) employed to displace the shutter blade elements with respect to one another in a manner more fully described in the above-cited Whiteside patent.

Each of the blade elements 20A and 20B of the blade mechanism 18 includes two secondary apertures 28A, 30A and 28B, 30B, respectively. The aperture 28A in the blade 20A cooperates with the aperture 28B in the blade 20B to form an opening 32 and the aperture 30A in blade 20A cooperates with aperture 30B in blade 20B to form an opening 34 through the shutter mechanism 18. These cooperating secondary apertures may be configured to track in a predetermined corresponding relationship with respect to the scene light admitting primary apertures 22A and 22B. With the primary and secondary apertures being formed in the same blade element and therefore being mechanically coupled to one another, it is readily apparent that the secondary apertures can move in the same manner as the primary apertures when the blade elements 20A and 20B are displaced, in the above-described manner, with respect to one another. The amount of artificial light admitted to the film plane 16 through the primary apertures 22A and 22B is controlled by a signal generated by a combination of an infrared photosensitive element 36 and an integrator (not shown) within an infrared sensor 38 that senses and integrates a corresponding amount of infrared scene energy through the opening 32. The amount of ambient scene light admitted to the film plane 16 through these primary apertures is controlled by a signal generated by a combination of a visible light photosensitive element 40 and an integrator (not shown) within a visible light sensor 42 that senses and integrates a corresponding amount of visible ambient scene light, through the opening 34. An example of scanning blade elements having primary and secondary apertures that cooperate to control the amount of scene light admitted to a film plane is shown in U.S. Pat. No. 3,942,183, supra.

The camera 10 is provided with a blade position sensor/encoder 44. The sensor/encoder 44 senses the position of the blade elements 20A and 20B with respect to one another and generates a signal representative of the relative blade element position. The sensor/encoder 44 comprises a light emitting diode 46, a photosensor 48 spaced therefrom, and a plurality of slots or openings 50 and 52 formed in the blade element 20A and 20B, respectively. The slots 50, 52 are rectangular in shape, are of uniform size and are equally spaced in a linear direction in their respective blade elements 20A and 20B. The slots 50, 52 are interposed between the light emitting diode 46 and the photosensor 48 such that they alternately block and unblock the transmission of light between these two components to thereby cause the photosensor 48 to generate one or more pulses 54 representative of the relative position of the blade elements 20A and 20B. The position of the blade element 20A with respect to the blade element 20B defines the size of the effective or taking aperture formed by the primary apertures 22A and 22B in the blade mechanism 18. Therefore, the relative position of the blade elements 20A and 20B represented by the pulse or pulses 54 is also a measure of the size of the effective or taking aperture formed by the primary apertures 22A and 22B. The size of the slots 50, 52 in respective blade members 20A and 20B is kept to a minimum, in the direction of blade member movement, in order to minimize any blade position errors between the actual size of an effective aperture formed by the primary apertures 22A and 22B and the relative blade position pulses 54 representative of the size of this particular aperature.

The camera 10 is also provided with an electronic flash apparatus 56 together with apparatus for controlling its energization in order to determined subject reflectivity for subject distance or range related reasons and to provide a portion of the exposure value required to illuminate a scene to be photographed. The electronic flash apparatus 56 comprises a main storage capacitor 58 which may be charged up to an operating voltage by any conventional voltage converter circuit (not shown) which would be included within a DC-DC voltage converter 60. The DC-DC voltage converter 60 operates in a conventional manner to convert a DC voltage as may be derived from a battery 62 of the camera 10, which can be in the order of 6 volts, to a suitable operating voltage such as 280 volts. A flash tube 64 of the electronic flash apparatus 56 is electrically coupled to the main storage capacitor 58 by a flash tube firing circuit 66. The details of the firing circuit 66 will be described below with respect to FIG. 3. The flash tube firing circuit 66 is, in turn, coupled to a conventional firing circuit driver 68 that generates fixed and variable width pulses respectively, at the outputs 70 and 71 thereof that control when and for how long the flash tube 64 illuminates a subject to be photographed with visible and infrared light. The firing circuit driver 68 is actuated by a camera operator initiated flash sequence initiating signal from an exposure control 72 on a path 74. The flash tube firing circuit 66 will now be described in detail.

Figure 3:
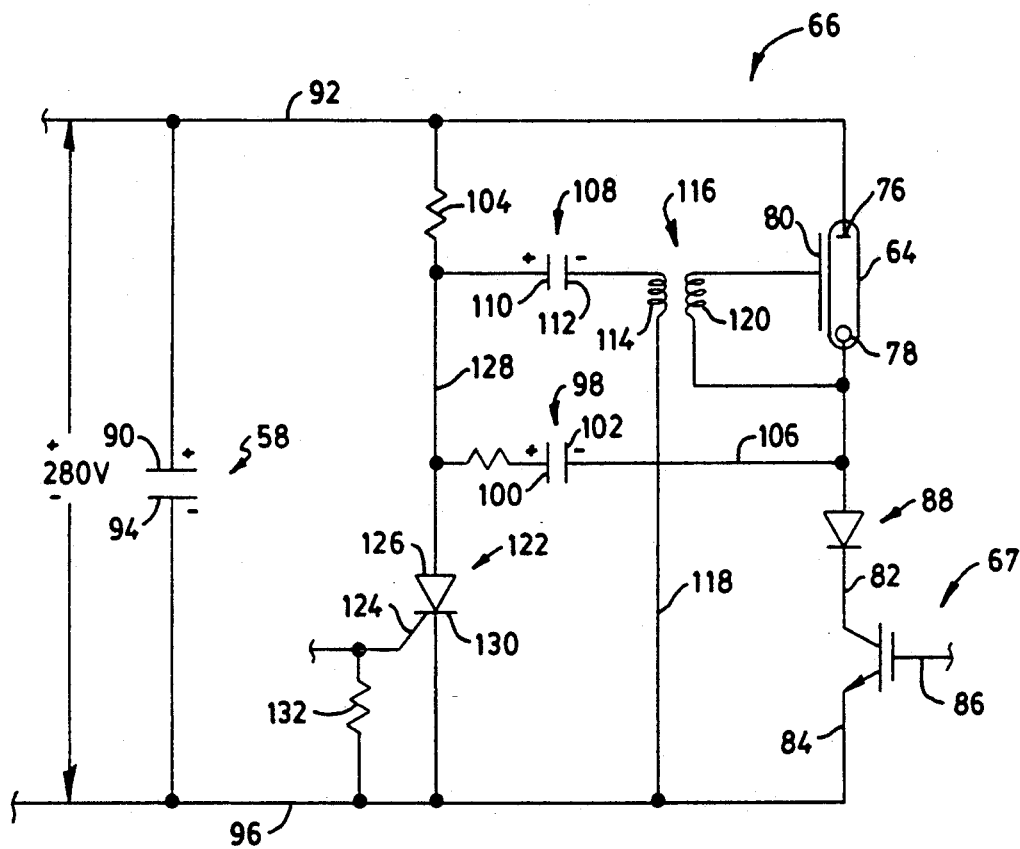
FIG. 3 is a detailed schematic diagram of an electrical circuit for controlling the light output of the flash tube in the electronic flash camera of FIG. 1.

As shown in FIG. 3, the flash tube firing circuit 66 includes the electronic flash tube 64 having an anode 76, a cathode 78 and a trigger electrode 80. The flash tube 64 is preferably a conventional flash tube having relatively high resistance. The firing circuit 66 also includes an insulated gate bipolar transistor or IGBT 67, such as that which is available from the Mitsubishi Electric Corporation of Tokyo, Japan, having a collector terminal 82, an emitter terminal 84 and a gate terminal 86. The cathode 78 of the flash tube 64 is connected to the collector terminal 82 of the IGBT 67 through a blocking diode 88. The anode 76 of the flash tube 64 is connected to a positively charged electrode 90 of the main storage capacitor 58 through a path 92 and the emitter terminal 84 of the IGBT 67 is connected to a negatively charged electrode 94 of the main storage capactitor 58 through a path 96.

A voltage doubler capacitor 98 is connected between the positively and negatively charged electrodes 90 and 94, respectively, of the main storage capacitor 58. The doubler capacitor 98 includes an electrode 100 and an electrode 102. The electrode 100 is connected to the positively charged electrode 90 of the main storage capacitor 58 through a resistor 104 and the path 92, and the electrode 102 is connected to the negatively charged electrode 94 of the main storage capacitor 58 through the path 106, the blocking diode 88, the IGBT 67 when in its conductive state and the path 96.

A trigger capacitor 108 is also connected between the positively and negatively charged electrodes 90 and 94, respectively, of the main storage capacitor 58. The trigger capacitor 108 includes a positively charged electrode 110 and a negatively charged electrode 112. The electrode 110 is connected to the positively charged electrode 90 of the main storage capacitor 58 through the resistor 104 and the path 92 and the electrode 112 is connected to the negatively charged electrode 94 of the main storage capacitor 58 through a primary winding 114 of a step-up transformer 116, a path 118 and the path 96. The trigger electrode 80 of the electronic flash tube 64 is connected to the cathode 78 of the flash tube 64 through a secondary winding 120 of the step-up transformer 116.

A silicon controlled rectifier or SCR 122 having a gate electrode 124 is also connected between the positively and negatively charged electrodes 90 and 94, respectively, of the main storage capacitor 58. A cathode 126 of the SCR 122 is connected to the electrode 90 through the resistor 104, the path 92 and a path 128. An anode 130 of the SCR 122 is connected to the electrode 94 through the path 96. In addition, the gate electrode 124 of the SCR 122 is connected to the electrode 94 of the main storage capacitor 58 through a bias resistor 132 and the path 96.

The flash tube 64 is activated to illuminate a scene to be photographed with visible light and infrared in the following manner. Prior to the activation of the flash tube 64, the DC-DC voltage converter 60 charges the main storage capacitor 58 to a voltage level of approximately 280 VDC. The main storage capacitor electrode 90 is charged positively and the main storage capacitor electrode 94 is charged negatively with respect to the electrode 90 by the voltage converter 60. With the trigger capacitor 108 being connected across the main storage capacitor 58 in the above-described manner, this capacitor is also charged to 280 VDC. The electrodes 110 and 112 of the trigger capacitor 108 are charged positively and negatively, respectively.

Figure 4:
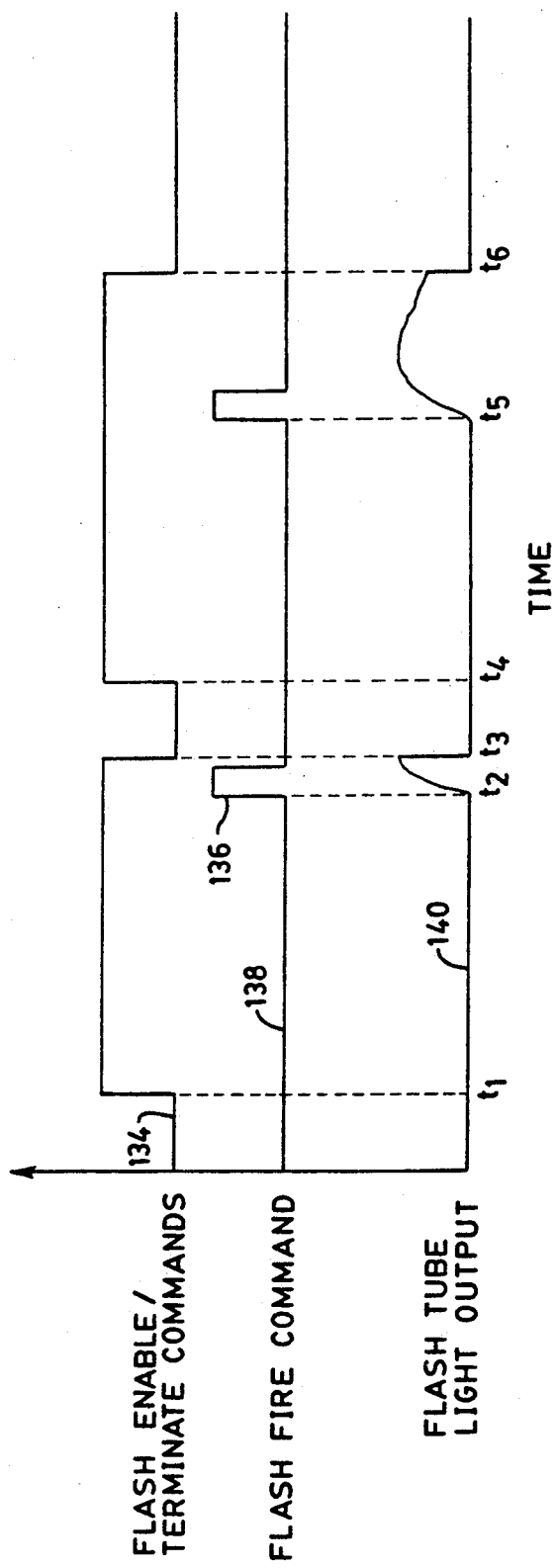
FIG. 4 is a graph of an IGBT enable/terminate signal, a flash tube fire signal and flash tube light output as a function of time, during an exposure cycle.

With additional reference to FIG. 4, when, for example, a camera operator generated, flash sequence initiating signal from the exposure control 72 is applied to the firing circuit driver 68 through the path 74, a flash enable command is generated at a time $t_1$ as shown by a curve 134 in FIG. 4, at the output 70 thereof and then applied to the gate 86 of the IGBT 67 to thereby activate the IGBT 67 from its non-conductive to its conductive state. When the IGBT 67 is placed in its conductive state, the voltage doubler capacitor 98 is connected across the main storage capacitor 58 and is therefore charged to the same 280 VDC level as that of the main storage capacitor 58. Subsequent to the charging of the voltage doubler capacitor 98 in this manner, and in response to the flash sequence initiating signal on the path 74, a flash firing command in the form of a pulse 136, as shown by a curve 138 in drawing FIG. 4, is generated at the output 71 of the firing circuit driver 68 at a time $t_2$ and is then applied to to gate 124 of the SCR 122. This flash firing command activates the SCR 122 from its non-conductive to its conductive state. As is well known, a voltage level on a capacitor cannot change instantaneously. Therefore, when the SCR 122 conducts, the flash tube 64 has +280 VDC applied to its anode 76 from the electrode 90 of the main storage capacitor 58 and −280 VDC from the electrode 102 of the capacitor 98 for a total of 560 VDC between the flash tube anode 76 and the cathode 78. The doubler capacitor 98, in effect, instantaneously doubles the voltage across the flash tube 64 over what it would have been when the SCR 122 conducted, absent such a doubler capacitor. In addition, the diode 88 becomes reversed biased when the −280 VDC is applied to the cathode 78 which blocks or prevents this voltage from interfering with the proper conduction of the IGBT 67.

At the same time that the SCR 112 is activated to its conductive state in order to cause the capacitor 98 to double the voltage across the flash tube 64 in response to the flash firing command pulse 136 at the time t₂, its activation also causes the trigger capacitor 108 to apply the +280 VDC stored therein to the primary winding 114 of the step-up transformer 116 through the path 128 and the path 118. This +280VDC is increased or stepped-up to approximately 4 K VDC and is then applied to the trigger electrode 80 of the flash tube 64 where it initiates or triggers the firing thereof at the time t₂ as shown by the curve 140 in drawing FIG. 4.

Subsequent to the completion of the flash firing command pulse 136, which can either be a fixed or a variable time thereafter, a flash terminating command is generated at a time t₃ at the output 70 of the firing circuit driver 68 as shown by the curve 134 in FIG. 4. The flash terminating command, in turn, is applied to the gate 86 of the IGBT 67. The flash terminating command is, in effect, a reduction in the magnitude of the flash enable command previously applied to the same gate 86 of the IGBT 67. When the flash terminating command is applied to the gate 86, it activates the IGBT 67 from its conductive to its non-conductive state to thereby interrupt the flow of electric charge through the flash tube 64 and the light output therefrom. This flash firing sequence is repeated for subsequent or other firings of the flash tube 64. The external load on the SCR 122 automatically causes the activation of the SCR 122 from its conductive to its non-conductive state after the flash tube 64 firing has been terminated by the IGBT 67 and after the flash firing command has been removed from the gate 124 of the SCR 122.

The camera 10 additionally includes a microcontroller and memory 142. Visible scene light sensed by the visible light sensor 42 is routed to the microcontroller and memory 142 through a path 144. Visible light sensed by the visible light sensor 42 is also routed to the exposure control 72 through a path 146. In addition, infrared scene light sensed by the infrared light sensor 38 is routed to the microcontroller and memory 142 through a path 148. Infrared light sensed by the infrared sensor 38 is also routed to the exposure control 72 through a path 150.

Included within the microcontroller and memory 142 is a reflectivity comparator 152. The reflectivity comparator 152 includes a fixed or constant reference signal (not shown) whose magnitude represents the distance between the near distance of the normal depth of field of the fixed focus lens 12 and the camera 10. A reflectivity signal or a signal representative of the infrared component of the flash tube 64 generated light that is reflected from a subject within a scene and sensed by the infrared light sensor 38 prior to an exposure interval is routed to the reflectivity comparator 152 within the microcontroller and memory 142. This infrared reflectivity signal is compared to the above-noted reference signal stored within the reflectivity comparator 152. If the comparator 152 determines that the magnitude of the infrared reflectivity signal is greater than the above-noted stored reference signal, indicating that the subject is closer than the near distance of the depth of field of the lens 12, the microcontroller and memory 142 generates a time delay enable signal, in response thereto, which is routed to a time delay circuit 154, through a path 156, within the exposure control 72, which has a fixed time delay period incorporated therein. After the time delay circuit 154 is so enabled, its fixed time delay period is initiated in response to the same command generated by the exposure control 72 that commands the shutter drive 26 to actuate the shutter blade mechanism 18 to initiate an exposure interval. When the time delay period of the time delay circuit 154 times out or expires, the exposure control 72 transmits a flash tube firing-sequence initiating signal to the electronic flash apparatus 56 to initiate a series of commands, as described above, required to fire the flash tube 64.

As noted above, the camera 10 is of the SLR type and therefore includes a conventional reflex mirror 158 that is actuatable by the exposure control 72 through a path 160. The mirror 158 is actuatable, in a conventional manner, between a viewing position where it blocks the transmission of scene light to the film plane 16 and where a camera operator can view a scene to be photographed through the lens 12, and a taking or unblocking position as shown in FIG. 1, where it facilitates the transmission of scene light to the film plane 16 during an exposure interval.

The camera 10 is preferably designed for use with a self-developing film unit (not shown) similar to those described in U.S. Pat. No. 3,415,644 to Land, in common assignment herewith, and specifically incorporated herein by reference. The self-developing film unit is packaged in a lighttight film cassette 162 which is shown, in FIG. 1, in the condition assumed just after it has been fully inserted into the camera 10. The cassette 162 may enclose the 6 VDC battery 62.

Mounted within the camera 10 is a film advancing apparatus 164 similar to that described in U.S. Pat. No. 3,753,392 to Land that includes a motor for operating a gear train (neither shown) which is coupled with the film advancing apparatus 164 to provide for the continuous movement of an exposed film unit from an exposure position within the camera 10 toward the exterior thereof. The film advancing apparatus 10 additionally includes a film-engaging arm member (not shown) driven by the above-mentioned motor and gear train. The arm member is adapted to extend into a slot in the cassette 162, as shown in the above-noted Land U.S. Pat. No. 3,753,392, and engage the uppermost film unit located therein at or near its trailing edge prior to moving it out of the cassette 162 and into the bite of a pair of conventional processing rollers (not shown) mounted adjacent the leading edge of the above-mentioned uppermost film unit. The processing rollers, which are rotated by the motor and gear train mentioned above continue the uninterrupted movement of the exposed film unit toward the exterior of the camera 10 while simultaneously rupturing a container of processing liquid at the leading of the exposed film unit. The processing rollers spread the liquid contents of the ruptured container between elements of the film unit to initiate formation of a visible image within the film unit in a manner that is well-known in the art.

OPERATION

A typical exposure cycle will now be described in detail. for the purpose of this description it is assumed that the taking aperture of the blade mechanism 18 is in its full open position, that the openings 32 and 34 formed by the secondary apertures in the blade mechanism 18 are also fully opened, that the mirror 158 is in its viewing or light blocking position, that the flash apparatus 56 has been energized by the prior closure of a switch 166 that coupled the battery 62 to the DC-DC voltage converter 60 through the exposure control 72 and a path 168 and that the main storage capacitor 58 and the trigger capacitor 108 are fully charged and ready for the initiation of an exposure cycle.

With reference to FIGS. 1, 2A, 2B, 3 and 4 of the drawings, a switch 170 is actuated to its closed position by a camera operator to initiate the exposure cycle. The closure of the switch 170 couples the battery 62 to the exposure control 72 through a path 172. The exposure control 72 then energizes the shutter drive 26 to actuate the blade mechanism 18 and therefore the taking aperture together with the opening 32 formed by the secondary apertures 28A and 28B and the opening 34 formed by the secondary apertures 30A and 30B to their fully closed positions. Subsequent to closing the opening 32 and prior to the initiation of an exposure interval, the shutter drive 26 causes the opening 32 to increase in size toward its fully opened position. While the opening 32 is being moved toward its fully opened position, the exposure control module 72 actuates means (not shown) for moving the mirror 158 from its viewing or light blocking position, where it precludes the transmission of image-carrying light rays to the film plane 16, to its light unblocking position (as shown in FIG. 1) where it facilitates the transmission of image-carrying light rays to the film plane 16 during an exposure interval. When the opening 32 adjacent the infrared light sensor 38 is in its fully open position, the exposure control module 72 commands the firing circuit driver 68 through the path 74 to generate a flash enable command at the time $t_1$ as shown by the curve 134 in FIG. 4 at the firing circuit driver output path 70 and at the input to the flash tube firing circuit 66. This flash enable command is, in turn, applied to the gate 86 of the IGBT 67 where it activates the IGBT 67 from its non-conductive to its conductive state as previously explained. At the time $t_2$ the firing circuit driver is similarly commanded to generate a flash firing command pulse 136, as shown by the curve 138 in FIG. 4, at its output path 71 and at the input to the flash tube firing circuit 66. This flash firing command is, in turn, applied to the gate 124 of the SCR 122 to initiate a pre-exposure interval flash tube firing in the previously described manner. A predetermined thirty-five microseconds after the application of this flash firing command, a flash terminating command is applied to the gate 86 of the IGBT 67 by the firing circuit driver 68 at the time $t_3$, in response to an exposure control 72 command on the path 74, in order to terminate the scene illuminating light output of the flash tube 64.

The flash terminating command applied to the gate 86 of the IGBT 67 at the time $T_3$ as represented by the curve 134 in FIG. 4 is a reduction in the magnitude of the flash enable command previously applied to the same gate 86. When applied to the gate 86, the flash terminating command activates the IGBT 67 from its conductive to its non-conductive state to thereby interrupt electrical charge flow to and therefore extinguish the scene illuminating light output from the flash tube 64. When activated in this manner, the flash tube 64 illuminates the scene to be photographed with a thirty-five microsecond pulse of visible and infrared light. This pulse of light constitutes a first pulse of light directed toward the scene to be photographed.

In addition to causing the illumination of the scene for thirty-five microseconds prior to an exposure interval, the exposure control 72 enables the integrator within the infrared sensor 38 through a path 174, the microcontroller and memory 142 and a path 176 during this same period of time, and then causes the integrated value thereof, which constitutes a measure of subject reflectivity, to be sent to the reflectivity comparator 152 within the microcontroller and memory 142, through the path 148, in the previously described manner. This subject reflectivity signal is then compared with the distance-related reference signal stored within the reflectivity comparator 152, a reference signal which is representative of the near distance of the depth of field of the lens 12.

As previously explained, if the comparator 152 determines that the magnitude of the subject reflectivity signal is greater than the above-noted reference signal, the microcontroller and memory 142 generates a signal that will enable the time delay circuit 154 within the exposure control 72 through the path 156. Subsequent to the pre-exposure interval firing of the flash tube 64 and after the above-described reflectivity signal has been compared by the comparator 152, the exposure control 72 commands the shutter drive 26 to actuate the shutter blade mechanism 18 to initiate an exposure interval. As explained above, this command to the shutter drive 26 also initiates the time-out of the fixed duration time delay circuit 154. When the time delay period of the time delay circuit expires, the exposure control 72 commands the firing circuit driver 68 through the path 74 to generate a flash enable command, at a time $t_4$ as shown by the curve 134 in FIG. 4, at the firing circuit driver output path 70 and at the input to the flash tube firing circuit 66. This flash enable command is, in turn, applied to the gate 86 of the IGBT 67 where it again activates the IGBT 67 from its non-conductive to its conductive state. At a time $t_5$ the firing circuit driver is similarly commanded to generate a flash firing command pulse at its output path 71 and at the input to the flash tube firing circuit 66 as shown by FIGS. 4 and 1, respectively. This flash firing command is then applied to the gate 124 of the SCR 122 to thereby initiate an exposure interval flash tube firing in the above-described manner. A flash terminating command is applied to the gate 86 of the IGBT 67 by the firing circuit driver 68 at the time $t_6$ in response to an infrared light sensor 38 derived flash terminating command from the exposure control 72 on the path 74, to terminate the scene illuminating light output of the flash tube 64, when the integrated level of reflected infrared light reaches a predetermined magnitude. The firing of the flash tube 64 in response to the time-out of the time delay circuit 154 causes the flash tube 64 to fire at a time when the shutter aperture is at a smaller value or size than would be employed if flash tube 64 was fired in the normal manner in response to scene light levels coming from a subject located closer to the camera than the near distance of the lens' normal depth of field. Firing the flash tube 64 at this substantially smaller shutter aperture increases the depth of field and thereby improves the sharpness of an image formed by the fixed focus lens 12 of a subject located closer to the camera than the near distance of the normal depth of field of the fixed focus lens 12.

If the comparator 152 determines that the magnitude of the subject reflectivity signal is equal to or less than the above-noted reference signal indicated that the subject is within the normal depth of field of the lens 12, the time delay circuit will not be enabled by the microcontroller and memory 142 and therefore the activation of the shutter blade mechanism 18 and the firing of the flash tube 64 during an exposure interval is primarily controlled, in a conventional manner, in response to scene lighting conditions as sensed by the infrared light sensor 38 and/or visible light sensor 42, without any effect from or involvement with the time delay circuit 154.

At the completion of the exposure interval, the exposure control 72 actuates the mirror 158 towards its light-blocking position, and actuates the film advancing apparatus 164 and the drive motor (not shown) included therein, through a path 178, to initiate the transport and processing of an exposed, self-developing film unit. The film advancing apparatus 164, in turn, moves the exposed film unit located in the cassette 162, through a path 180, into the bite of the pair of adjacent processing rollers (not shown), in the manner described above, to spread processing liquid between certain film layers and to move the exposed film unit into an exit slot (not shown) in a housing 182 of the self-developing camera 10. After the mirror 158 has been actuated to its light blocking position where it precludes the passage of light to the film plane 16, the exposure control 72 actuates the shutter drive 26 and the shutter mechanism 18 coupled thereto such that the primary or taking aperture thereof is placed in its fully opened position. After the film advancing apparatus 164 has moved the exposed film unit into the above mentioned pair of rollers, a film movement completion signal is routed to exposure control 72 through a path 184 and then to the microcontroller and memory 142 coupled thereto through the path 174. Upon receipt of this film movement completion signal, the exposure control 72 initiates the charging of the electronic flash apparatus 56 with a signal that is transmitted to the DC-DC converter 60 through the path 168. When the main storage capacitor 58 of the electronic flash apparatus 56 is fully charged, as sensed through the path 168, the exposure control 72 places the exposure control system of the camera 10 in condition for the initiation of the next exposure cycle.

In the exposure control system described above, a source of artificial light generated by the flash tube 64 was employed to illuminate the scene with both visible and infrared light. The flash tube 64 illuminates the scene twice during an exposure cycle, once before and once during an exposure interval. Both the visible and infrared light were employed for exposure control during an exposure interval. However, only the infrared light from the flash tube 64 was employed for exposure control immediately prior to the exposure interval. By firing the flash tube 64 twice and utilizing the infrared portion of the illumination generated thereby in the determination of subject reflectivity before an exposure interval, only a single source of illumination is required. It should be noted, however, that exposure interval and pre-exposure interval illumination could be provided with two separate light sources. One source would be that provided by the flash tube 64 to generate both visible and infrared light and would be employed during the exposure interval. The other source would only have to emit infrared light prior to an exposure interval and therefore an infrared light emitting diode, for example, could be employed for such purposes.

From the foregoing description of the invention it will be apparent to those skilled in the art that various improvements and modifications can be made in it without departing from its true scope. The embodiment described herein is merely illustrative and should not be viewed as the only embodiment that might encompass the invention.

What is claimed is:

1. An exposure control system for photographic apparatus having means for defining a film plane and a fixed focus lens for directing light along an optical path from a scene onto photosensitive material located in the film plane, said exposure control system comprising:

a blade mechanism mounted for movement between a blocking arrangement in which said blade mechanism is in light blocking relation with respect to the optical path so as to preclude scene light from being transmitted along the optical path to the film plane and an unblocking arrangement in which said blade mechanism is in light unblocking relation with respect to the optical path so as to allow the passage of scene light to the film plane, said blade mechanism serving to provide an exposure aperture through which scene light passes and whose size varies in a predetermined manner when said blade mechanism is actuated between its said light blocking and unblocking arrangements to produce an exposure interval;

drive means for displacing said blade mechanism between its said blocking and unblocking arrangements to define said exposure interval;

a light source for illuminating the scene with artificial light that is energizable for a period of time before and for a period of time during the exposure interval;

light sensitive means for detecting, prior to an exposure interval, light emitted by said light source and reflected from a subject within the scene that is located at a distance less than a predetermined magnitude and for generating a first signal representative thereof comprising means for storing a reference signal representative of the near distance of the normal depth of field of the fixed focus lens, means responsive to the light emitted by said light source and reflected from the subject within the scene and for generating a signal representative of subject reflectivity and a comparator for comparing said reference signal to said subject reflectivity signal, and for detecting light emitted by said light source and reflected from the scene during the exposure interval and for generating a second signal representative thereof; and control means 1) for actuating said drive means to effect displacement of said blade mechanism to produce said exposure interval, 2) for energizing and de-energizing said light source to illuminate the scene and a subject included therein, before said exposure interval, 3) responsive to said first signal for energizing said light source a fixed period of time after actuating said drive means to initiate said blade mechanism displacement, said fixed period of time being just sufficient for the aperture to reach a size which is smaller than that which would be normally used, and 4) responsive to said second signal for de-energizing said light source during said exposure interval.

* * * * *